(12) United States Patent  (10) Patent No.: US 9,851,415 B2
Dong et al.  (45) Date of Patent: Dec. 26, 2017

(54) METHOD FOR ANALYZING OPERATION STATE OF SUBSTATION BY COMBINING WHOLE GRID MODEL WITH LOCAL GRID MODEL

(71) Applicants: North China Electric Power University, Beijing (CN); STATE GRID CORPORATION OF CHINA (SGCC), Beijing (CN); State Grid Shanxi Changzhi Power Supply Company, Shanxi (CN)

(72) Inventors: Lei Dong, Shanxi (CN); Ye Li, Shanxi (CN); Aizhong Tian, Shanxi (CN); Xiaoli Shen, Shanxi (CN); Peng Liu, Shanxi (CN); Chanqiong Wang, Shanxi (CN)

(73) Assignees: North China Electric Power University; State Grid Shanxi Changzhi Power Supply Company

( * ) Notice: Subject to any disclaimer, the term of this patent is extended or adjusted under 35 U.S.C. 154(b) by 450 days.

(21) Appl. No.: 14/609,632

(22) Filed: Jan. 30, 2015

(65) Prior Publication Data

US 2015/0346287 A1  Dec. 3, 2015

(30) Foreign Application Priority Data

May 27, 2014  (CN) .......................... 2014 1 0226290

(51) Int. Cl.
*G01R 31/00* (2006.01)
*G01R 31/40* (2014.01)
(Continued)

(52) U.S. Cl.
CPC ........... *G01R 31/40* (2013.01); *G01R 31/021* (2013.01); *G01R 31/025* (2013.01);
(Continued)

(58) Field of Classification Search
CPC ...................................................... G01R 31/40
See application file for complete search history.

(56) References Cited

U.S. PATENT DOCUMENTS

2012/0281444 A1* 11/2012 Dent ....................... H02M 1/32
363/56.01
2015/0365003 A1* 12/2015 Sadwick ................. H02M 3/28
363/21.01

FOREIGN PATENT DOCUMENTS

CN  1619568 A  5/2005
CN  101363886 A  2/2009
(Continued)

OTHER PUBLICATIONS

First Chinese Office Action regarding Application No. 201410226290.1 dated Mar. 3, 2016. English translation provided by Unitalen Attorneys at Law.

(Continued)

*Primary Examiner* — Phuong Huynh
(74) *Attorney, Agent, or Firm* — Harness, Dickey & Pierce, P.L.C.

(57) ABSTRACT

The disclosure relates to the crossing field between a power transmission of an ultra-high-voltage and a power system simulation, specifically a method for analyzing an operation state of a substation by combining a whole grid model with a local grid model is provided according to the disclosure. The method includes following steps: performing a load flow calculation for the provincial grid to which a ultra-high-voltage line belongs, wherein initial data of the load flow calculation employs a grid model with E format for national power grid dispatching control center; making an equivalent transform for the model, forming an island independently from the provincial grid to which a ultra-high-voltage line belongs, and making a load flow calculation for (Continued)

the island to acquire data of node voltages and line transmission power.

9 Claims, 3 Drawing Sheets

(51) Int. Cl.
  *G01R 31/02* (2006.01)
  *G06F 17/50* (2006.01)
  *G06F 11/30* (2006.01)
(52) U.S. Cl.
  CPC ....... *G01R 31/027* (2013.01); *G06F 17/5009* (2013.01); *G06F 17/5036* (2013.01); *G06F 2217/78* (2013.01); *Y02E 60/76* (2013.01); *Y04S 40/22* (2013.01)

(56) References Cited

FOREIGN PATENT DOCUMENTS

| | | |
|---|---|---|
| CN | 102053203 A | 5/2011 |
| KR | 20100138418 A | 12/2010 |
| KR | 101266954 B1 | 5/2013 |

OTHER PUBLICATIONS

Dongying, Zhang et al.: "Universal Simulation Project of Substation Protection System", China Academic Journal Electronic Publishing House, vol. 22, No. 3, Mar. 1998, pp. 61-64.

\* cited by examiner

| | operation condition | fault setting | analysis item |
|---|---|---|---|
| ultra-high-voltage compatibilization operation/ultra-high-voltage power-off and power-on operation | steady state operation | no fault | analyze over-voltage of the main transformer |
| | | | analyze over-current of the main transformer |
| | fault operation | single-phase ground short circuit fault at high-voltage side of the main transformer | analyze over-voltage of main transformer |
| | | single-phase ground short circuit fault at medium-voltage side of the main transformer | |
| | | three-phase ground short circuit fault at medium-voltage side of the main transformer | |
| | | single-phase ground short circuit fault on a transmission line connected to the ultra-high-voltage substation | |
| | | single-phase ground short circuit fault and inter-phase short circuit fault at high-voltage side of the main transformer | analyze a breaking capacity of circuit-breakers at three sides of high-voltage, medium-voltage and low-voltage of the main transformer |
| | | single-phase ground short circuit fault and inter-phase short circuit fault at medium-voltage side of the main transformer | |
| | | single-phase ground short circuit fault and inter-phase short circuit fault at low-voltage side of the main transformer | |

FIG. 2

| operation condition | fault setting | analysis item |
|---|---|---|
| ultra-high-voltage compatibilization operation/ultra-high-voltage power-off and power-on operation | no fault | pilot distance protection, current differential protection, bus current differential protection and transformer differential protection for the line connected to the substation |
| | inside of the region of the main transformer: set faults at high voltage side, medium voltage side and low voltage side of the main transformer respectively | the same as above |
| | outside of the region of the main transformer: set faults at high voltage side, medium voltage side and low voltage side of the main transformer respectively | the same as above |
| | fault on a incoming line of the substation | the same as above |
| | fault on a bus connected to high voltage side of the substation | the same as above |

METHOD FOR ANALYZING OPERATION STATE OF SUBSTATION BY COMBINING WHOLE GRID MODEL WITH LOCAL GRID MODEL

The present application claims priority to Chinese patent application No. 201410226290.1 titled "METHOD FOR ANALYZING OPERATION STATE OF SUBSTATION BY COMBINING WHOLE GRID MODEL WITH LOCAL GRID MODEL" and filed with the State Intellectual Property Office on May 27, 2014, which is incorporated herein by reference in its entirety.

FIELD

The disclosure relates to a crossing field between a power transmission of an ultra-high-voltage substation and a power system simulation, and in particular to a method for simulating and analyzing an operation state of equipments of a substation adjacent to an ultra-high-voltage substation by combining a whole grid model with a local grid model after an ultra-high-voltage substation compatibilization. And specifically, a method for analyzing an operation state of a substation by combining a whole grid model with a local grid model is provided according to the disclosure.

BACKGROUND

At present, a first domestic ultra-high-voltage alternating current line has been put into operation, a research about an effect of an ultra-high-voltage environment on a primary equipment and secondary equipment on has been initiated. A substation adjacent to an ultra-high-voltage substation, which serves as a power supply point for supplying ultra-high-voltage, plays a key role for ensuring power-transmission capability of the ultra-high-voltage substation; in other words, a stable operation of the adjacent substation is necessary for reliably supplying ultra-high-voltage. With an ultra-high-voltage compatibilization, a security of the devices of the adjacent substation may be affected to some extent due to a heavy load operation over a long term, since the electricity transmitted by the ultra-high-voltage substation is increased and a load to be delivered is increased; specifically, a flow transferring and a voltage amplitude of the adjacent ultra-high-voltage substation can be larger than the corresponding level before the compatibilization if an ultra-high-voltage accident occurred, which brings a challenge for a secure and stable operation of the adjacent substation. In order to operate the adjacent transformer securely and stably, it is necessary to research the operation functionality of the primary equipment and the secondary equipment of the adjacent substation under all operating characteristic of a grid after the ultra-high-voltage compatibilization. However, at present, there is no method for analyzing an operation state of a specific equipment of the adjacent substation after the ultra-high-voltage compatibilization.

SUMMARY

It is provided a method for analyzing an operation state of a substation by combining a whole grid model with a local grid model according to the disclosure, so as to solve a technical problem that there is no method for fully analyzing an operation state of a specific equipment of a substation adjacent to an ultra-high-voltage substation after an ultra-high-voltage compatibilization.

The disclosure is implemented according the following technical solutions, a method for analyzing an operation state of a substation by combining a whole grid model with a local grid model is provided, wherein the method includes:

step 1: performing a load flow calculation on a provincial grid to which a ultra-high-voltage line belongs, wherein initial data of the load flow calculation takes a grid model with E format for national power grid dispatching control center; performing an equivalent transformation on the model, forming an island independently from the provincial grid to which a ultra-high-voltage line belongs, and performing a load flow calculation on the island to acquire data of node voltages and line transmission power;

step 2: analyzing a current carrying capacity and the voltage based on the acquired data in the step 1 to summarize a flow characteristic of the whole grid system after an ultra-high-voltage compatibilization, and provide initial data for a transient simulation; and step 3: establishing a local simulation model in a transient simulation software to analyze a primary equipment of a substation after the ultra-high-voltage compatibilization based on the initial data provided in the step 2, and studying over-voltage, over-load and breaking capability of a circuit breaker of a transformer of the ultra-high-voltage substation in various conditions through calculation.

The processes of "performing a load flow calculation, forming an island independently from the provincial grid to which a ultra-high-voltage line belongs, and establishing a local simulation model in a transient simulation software" are known techniques for the skilled in the art, and can be easily implemented, the process of "analyzing a current carrying capacity and the voltage based on the acquired data in the step 1 to summarize a characteristic about a flow of the whole grid system after an ultra-high-voltage compatibilization, and provide initial data for a transient simulation" is a well known method for the skilled in the art.

The disclosure has the following advantages. Based on the method for simulating and analyzing an operation state of equipments of a substation adjacent to an ultra-high-voltage substation by combining a whole grid model with a local grid model after an ultra-high-voltage compatibilization according to the disclosure, not only an effect of the increased ultra-high-voltage transmission capacity on the flow of the system is analyzed, but also the effect on a primary equipment and a secondary equipment under a complex ultra-high-voltage environment, such as ultra-high-voltage and heavy load operation over a long term, ultra-high-voltage accident and change of ultra-high-voltage operation mode is deeply analyzed through a local detailed modeling. Specifically, a method for analyzing a operation characteristic of the primary equipment and the operation controlling mode of the secondary equipment under ultra-high-voltage and heavy load condition is put forward, and based on which a method for deeply analyzing the effect of the complex ultra-high-voltage environment on a relay protection is further put forward. With the simulating and analyzing method by combining a whole grid model with a local grid model, it is ensured that the primary equipment of the adjacent substation can be operated safely and the second equipment can be controlled correctly. Based on the whole grid model, total data can be provided, a flow effect of the whole grid can be calculated, and a general rule can be analyzed; and based on the local grid model, a fine simulation can be implemented, and equipment security can be analyzed accurately.

BRIEF DESCRIPTION OF THE DRAWINGS

FIG. 2 is a specific analytical contents for a primary equipment of the substation for an ultra-high-voltage compatibilization and ultra-high-voltage power-off and power-on operation according to the disclosure; and FIG. 3 is a specific analytical content for a secondary equipment of the substation for an ultra-high-voltage compatibilization and ultra-high-voltage power-off and power-on operation according to the disclosure.

DETAILED DESCRIPTION OF THE EMBODIMENTS

Figure 1:
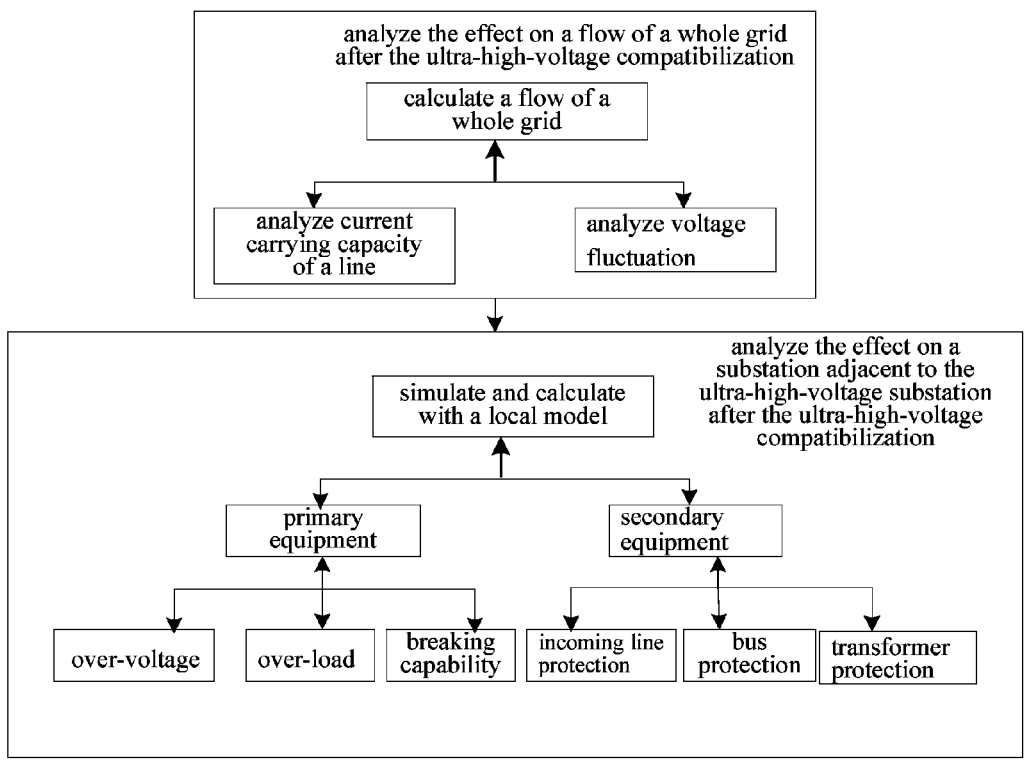
FIG. 1 is a structural diagram of a method for analyzing an operation state of equipments of a substation adjacent to an ultra-high-voltage substation by combining a whole grid model with a local grid model after an ultra-high-voltage compatibilization according to the disclosure.

The preferable embodiments of the present invention will be described in detail below in conjunction with the accompanying drawings. It should be noted that, the following explanation is only illustrative, and is not intended to limit the scope of the disclosure and the application thereof.

The specific implement steps will be described according to steps 1 to 4. In step 1, as shown in FIG. 1, based on the method for analyzing an operation state of equipments of a substation adjacent to an ultra-high-voltage substation by combining a whole grid model with a local grid model after an ultra-high-voltage compatibilization, a load flow calculation is performed on the provincial grid to which a ultra-high-voltage line belongs, wherein initial data of the load flow calculation takes a grid model with E format for national power grid dispatching control center; an equivalent transformation is performed on the model, the provincial grid to which a ultra-high-voltage line belongs is formed as an island independently, and a load flow calculation is performed on the island to acquire data of node voltages and line transmission power; and a flow characteristic of the whole grid system after the ultra-high-voltage compatibilization is firstly analyzed after the load flow calculation for the whole grid (i.e. provincial grid).

In step 2, a current carrying capacity and the voltage are analyzed based on the acquired data in the step 1, to summarize a flow characteristic of the whole grid system after the ultra-high-voltage compatibilization, and provide initial data for a transient simulation. Specifically, this process is performed by analyzing the effect of a disconnection of a certain circuit on the current carrying capacity of the whole grid circuits and analyzing the effect of a sudden tripping or switching of a large unit of the grids at both sides of ultra-high-voltage substation on voltage fluctuation of the whole grid after the ultra-high-voltage compatibilization. The analysis described above provides a data support and theoretical basis for analyzing the primary equipment and the secondary equipment of the substation adjacent to the ultra-high-voltage substation.

In step 3, as shown in FIG. 1, the primary equipment of the substation is analyzed using the local simulation model after the ultra-high-voltage compatibilization, specific analyzing contents are shown in FIG. 2. Specifically, the process includes: analyzing over-voltage and over-current of a main transformer of the substation after the ultra-high-voltage compatibilization or when power-off and power-on operation are in a steady state condition, respectively; analyzing over-voltage of a main transformer of the substation after the ultra-high-voltage compatibilization, or when power-off and power-on operation are in a fault state condition (a single-phase ground short circuit fault at high-voltage side and medium-voltage side of the main transformer, a three-phase ground short circuit fault at medium-voltage side of the main transformer, and a single-phase ground short circuit fault on a transmission line connected to the ultra-high-voltage substation), respectively, and analyzing a breaking capability of circuit-breakers at three sides of high-voltage, medium-voltage and low-voltage of the main transformer after the ultra-high-voltage compatibilization or when power-off and power-on operation are in a fault state condition (a single-phase ground short circuit fault and a inter-phase short circuit fault at high-voltage side, medium-voltage side and low-voltage side of the main transformer, and a single-phase short circuit ground fault and a inter-phase short circuit fault on a transmission line connected to the ultra-high-voltage substation), respectively.

In step 4, as shown in FIG. 1, the primary equipment of the ultra-high-voltage substation with increased capacity is analyzed using the local simulation model, specific analyzing contents are shown in FIG. 3. Specifically, the process includes: analyzing action situations about a pilot distance protection, a current differential protection, a bus current differential protection and a transformer differential protection for the line connected to the substation after the ultra-high-voltage compatibilization, or when power-off and power-on operation are in a steady state or fault state condition, respectively (a single-phase ground fault, an inter-phase short circuit fault, an inter-phase ground fault and a three-phase ground short circuit fault, inside of the region of the main transformer of the substation, outside of the region of the main transformer of the substation, on a bus connected to the high-voltage side of the main transformer of the substation, and on a incoming line at the high-voltage side of the transformer of the substation, respectively.), respectively.

Based on the steps described above, the operation states of the primary equipment and the secondary equipment of the substation after the ultra-high-voltage compatibilization can be fully analyzed from both whole grid and local grid. The method involves various operation conditions and various analysis items, and the acquired analysis result plays an instructive role in safe and reliable operation of the ultra-high-voltage.

The foregoing are only preferred specific embodiments of the disclosure, and the scope of protection of the disclosure is not limited thereto. Any changes or alternates that may be easily conceived by those skilled in the art within the technical scope disclosed by the disclosure should be within the scope of protection of the disclosure. Therefore, the scope of protection of the disclosure should conform to the scope of protection of the claims.

The embodiments of the invention have been explained and described in detail by applicants of the disclosure in conjunction with the accompanying drawings of the specification. However, it should be understood by the skilled in the art that the above embodiments are only the preferable embodiments of the invention, the explanation in detail is only intended to help readers to understand the spirit of the disclosure better, but is not intended to limit the scope of protection of the disclosure. On the contrary, any changes or modifications made based on the spirit of the disclosure should fall within the scope of protection of the disclosure.

The invention claimed is:

1. A method for analyzing an operation state of a substation by combining a whole grid model with a local grid model, comprising:

step 1: performing a first load flow calculation on a provincial grid to which a ultra-high-voltage line belongs, wherein initial data of the first load flow calculation takes a grid model with E format for a national power grid dispatching control center; performing an equivalent transformation on the grid model; forming an island independently from the provincial grid to which the ultra-high-voltage line belongs; and performing a second load flow calculation on the island to acquire data of node voltages and line transmission power;

step 2: analyzing a current carrying capacity and the node voltages based on the acquired data in the step 1 to obtain a flow characteristic of a whole grid system after an ultra-high-voltage compatibilization; and providing initial data for a transient simulation;

step 3: establishing a local simulation model in a transient simulation software based on the provided initial data in the step 2 to analyze a primary equipment of an ultra-high-voltage substation after the ultra-high-voltage compatibilization; and obtaining over-voltage, over-load and breaking capability of a circuit breaker of a transformer of the ultra-high-voltage substation in various conditions through calculation; and step 4: controlling the ultra-high-voltage line in a steady and secure range according to the over-voltage, over-load and breaking capability of the circuit breaker of the transformer of the ultra-high-voltage substation.

2. The method for analyzing an operation state of a substation by combining a whole grid model with a local grid model according to claim 1, further comprising:

step 5: for an ultra-high-voltage environment of ultra-high-voltage and heavy load operation over a long term, ultra-high-voltage accident, or change in ultra-high-voltage operation mode, determining whether a relay protection and secondary equipment in the ultra-high voltage substation can be protected as required through calculation.

3. The method for analyzing an operation state of a substation by combining a whole grid model with a local grid model according to claim 1, wherein in the first load flow calculation in the step 1, the flow characteristic of the whole grid system after the ultra-high-voltage compatibilization is analyzed by analyzing the effect of disconnection of a certain circuit on the current carrying capacity of the whole grid system, and by analyzing the effect of a sudden tripping or switching of a large unit of the grids at both sides of ultra-high-voltage substation on voltage fluctuation of the whole grid system after the ultra-high-voltage compatibilization.

4. The method for analyzing an operation state of a substation by combining a whole grid model with a local grid model according to claim 2, wherein in the first load flow calculation in the step 1, the flow characteristic of the whole grid system after the ultra-high-voltage compatibilization is analyzed by analyzing the effect of disconnection of a certain circuit on the current carrying capacity of the whole grid system, and by analyzing the effect of a sudden tripping or switching of a large unit of the grids at both sides of the ultra-high-voltage substation on voltage fluctuation of the whole grid system after the ultra-high-voltage compatibilization.

5. The method for analyzing an operation state of a substation by combining a whole grid model with a local grid model according to claim 1, wherein the process of analyzing the primary equipment of the ultra-high-voltage substation using the local simulation model after the ultra-high-voltage compatibilization comprises:

analyzing over-voltage and over-current of a main transformer of the ultra-high-voltage substation after the ultra-high-voltage compatibilization, or when power-off and power-on operation are in a steady state condition, respectively; and analyzing over-voltage of the main transformer of the ultra-high-voltage substation after the ultra-high-voltage compatibilization, or when power-off and power-on operation are in a fault state condition, respectively, wherein the fault condition comprises:

a single-phase ground short circuit fault at high-voltage side and medium-voltage side of the main transformer, a three-phase ground short circuit fault at medium-voltage side of the main transformer, and a single-phase ground short circuit fault on a transmission line connected to the ultra-high-voltage substation.

6. The method for analyzing an operation state of a substation by combining a whole grid model with a local grid model according to claim 2, wherein the process of analyzing the primary equipment of the ultra-high-voltage substation using the local simulation model after the ultra-high-voltage compatibilization comprises:

analyzing over-voltage and over-current of a main transformer of the ultra-high-voltage substation after the ultra-high-voltage compatibilization, or when power-off and power-on operation are in a steady state condition, respectively; and analyzing over-voltage of the main transformer of the ultra-high-voltage substation after the ultra-high-voltage compatibilization, or when power-off and power-on operation are in a fault state condition, respectively, wherein the fault condition comprises:

a single-phase ground short circuit fault at high-voltage side and medium-voltage side of the main transformer, a three-phase ground short circuit fault at medium-voltage side of the main transformer, and a single-phase ground short circuit fault on a transmission line connected to the ultra-high-voltage substation.

7. The method for analyzing an operation state of a substation by combining a whole grid model with a local grid model according to claim 1, wherein the process of analyzing the primary equipment of the ultra-high-voltage substation using the local simulation model after the ultra-high-voltage compatibilization comprises:

analyzing a breaking capacity of circuit-breakers at three sides of high-voltage, medium-voltage and low-voltage of a main transformer after the ultra-high-voltage compatibilization, or when power-off and power-on operation are in a fault state condition, respectively, wherein the fault condition comprises: a single-phase ground short circuit fault and an inter-phase short circuit fault at a high-voltage side, a medium-voltage side and a low-voltage side of the main transformer, and a single-phase ground short circuit fault and an inter-phase short circuit fault on a transmission line connected to the ultra-high-voltage substation.

8. The method for analyzing an operation state of a substation by combining a whole grid model with a local grid model according to claim 2, wherein the process of analyzing the primary equipment of the substation using the local simulation model after the ultra-high-voltage compatibilization comprises:

analyzing a breaking capacity of circuit-breakers at three sides of high-voltage, medium-voltage and low-voltage of a main transformer after the ultra-high-voltage compatibilization, or when power-off and power-on operation are in a fault state condition, respectively, wherein the fault condition comprises: a single-phase ground short circuit fault and an inter-phase short circuit fault at a high-voltage side, a medium-voltage side and a low-voltage side of the main transformer, and a single-phase ground short circuit fault and an inter-phase short circuit fault on a transmission line connected to the ultra-high-voltage substation.

9. The method for analyzing an operation state of a substation by combining a whole grid model with a local grid model according to claim 2, wherein the process of analyzing the secondary equipment of the substation with increased capacity using the local simulation model after the ultra-high-voltage compatibilization comprises:

analyzing action situations about a pilot distance protection, a current differential protection, a bus current differential protection and a transformer differential protection for the ultra-high-voltage line connected to the ultra-high-voltage substation after the ultra-high-voltage compatibilization or power-off and power-on operation are in a steady state or fault state condition, respectively, wherein the fault condition comprises: a single-phase ground fault, an inter-phase short circuit fault, an inter-phase ground fault and a three-phase ground short circuit fault, inside of a region of a main transformer of the ultra-high-voltage substation, outside of the region of the main transformer of the substation, on a bus connected to an high-voltage side of the main transformer of the substation, and on an incoming line at the high-voltage side of the main transformer of the ultra-high-voltage substation, respectively.

* * * * *